Nov. 20, 1945. H. A. BUEHNER 2,389,118
PRESSURE VESSEL CLOSURE
Filed April 21, 1943

Howard A. Buehner
INVENTOR.
BY
ATTORNEY.

Patented Nov. 20, 1945

2,389,118

UNITED STATES PATENT OFFICE 2,389,118

PRESSURE VESSEL CLOSURE

Howard A. Buehner, Milwaukee, Wis., assignor to A. O. Smith Corporation, Milwaukee, Wis., a corporation of New York Application April 21, 1943, Serial No. 483,914

2 Claims. (Cl. 220—46)

This invention relates to a pressure vessel closure.

The object of the invention is to provide a simple and novel closure structure that will seal automatically when pressure is applied internally of the vessel.

The invention is illustrated in the accompanying drawing in which.

Figure 1:
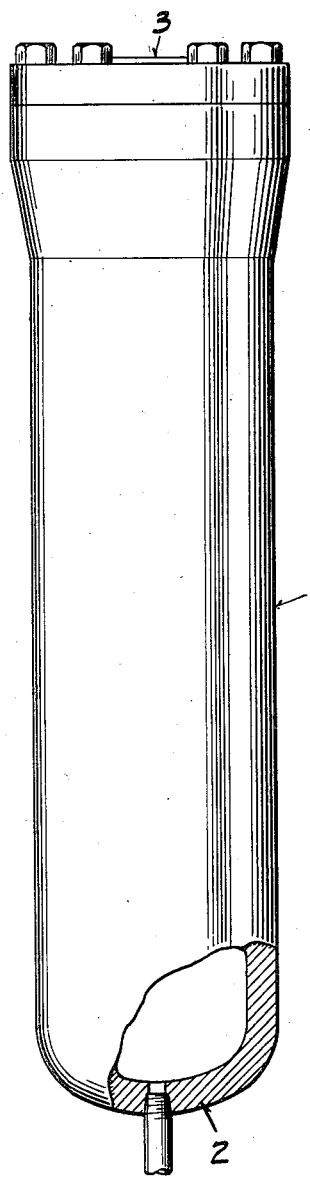
Figure 1 is a side elevation of a pressure vessel embodying the invention.

The vessel comprises a cylindrical shell section 1 with an integral end head 2 at one end and a removable end head 3 at the other end.

The head 3 extends into the end of the shell 1 and rests upon an internal circumferential shoulder 4 near the end of the shell. Above the shoulder 4 the head 3 is cut away to provide a radial space 5 between the edge of the head and the inside wall of the shell.

Figure 3:
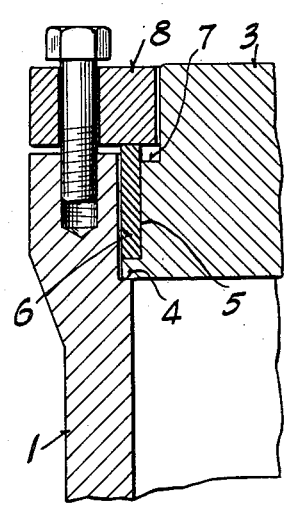
Fig. 3 is a longitudinal section of a portion of the closure end before the clamping ring is bolted down.

A cylindrical gasket 6 encircles the head and lies in the space 5 between it and the shell, the gasket being preferably of elastic compressible material snugly fitting the head and leaving a slight radial clearance between its outer surface and the inner wall of the shell as shown in Fig. 3 to permit easy insertion of the head.

Figure 2:
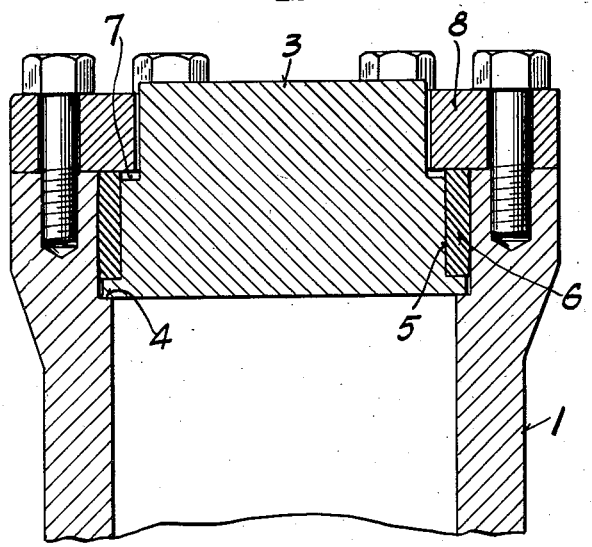
Fig. 2 is a central longitudinal section through the closure end of the vessel, the cover being shown in the position it assumes when there is no internal pressure in the vessel.

The outer end of head 3 is cut away radially to provide a shoulder 7 just short of the outer end of shell 1. The head is held in place against internal pressure in the vessel by a retaining ring 8 bolted to the end of the shell 1 and of an internal diameter that provides for the ring overhanging the shoulder 7. The shoulder 7 is spaced axially from the retainer ring 8 to allow for a slight endwise movement of the head 3 outwardly under fluid pressure in the vessel. The gasket 6 normally extends slightly beyond the end of the vessel as shown in Fig. 3 so that when the retaining ring 8 is bolted down the gasket is compressed to form an initial seal between the head and the shell as in Fig. 2.

Figure 4:
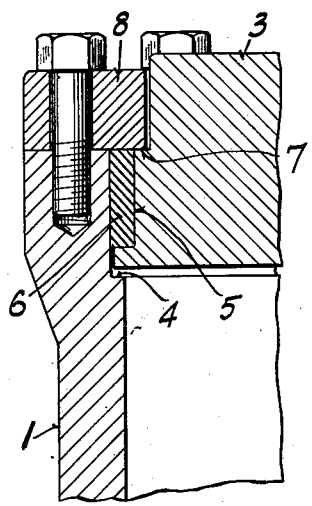
Fig. 4 is a view similar to Fig. 3 showing the parts after the clamping ring is bolted down and the cover forced outwardly by pressure within the vessel.

The movement of the head 3 outwardly against the retainer ring 8 causes an endwise compression of gasket 6 between the inner portion of head 3 and the retainer ring 8, thereby expanding the gasket 6 radially into tight engagement with the inner wall of shell 1 and more effectively sealing the vessel against leakage as shown in Fig. 4. Release of the pressure allows the head 3 to drop back against shoulder 4 and partially relieves the gasket 6 from endwise compression.

The retaining ring 8 limits the outward movement of head 3 and thereby limits the amount of compression of the gasket or sealing ring 6. The invention utilizes the fluid pressure upon the entire end head to effect a compression of the gasket for sealing purposes.

The invention may have various embodiments within the scope of the accompanying claims.

I claim:

1. A pressure vessel closure comprising a cylindrical vessel shell having an internal shoulder spaced from its end, a removable end head loosely fitting in the end of said shell and resting upon said shoulder to limit the inward movement of said head, a retaining ring overhanging said head and removably secured to said vessel shell at its outer end, a compressible cylindrical gasket encircling the head and extending axially between an axially outwardly facing shoulder of said head and the axially facing inner surface of said retaining ring, said gasket. having a radial clearance between it and the inner wall of the shell to provide for radial expansion of the gasket under axial compression, and said head and the overhanging portion of said retaining ring having an axial clearance therebetween to provide for limited outward movement of the head under internal fluid pressure in the vessel and consequent endwise compression of said gasket to expand the same radially against the wall of the shell and seal the closure without wedging action.

2. In a pressure vessel closure, a cylindrical vessel shell, a closure head disposed in one end of said shell and seated against a shoulder in the shell, a retaining member supporting the head against outward movement from said shell, and a cylindrical sleeve-like compressible packing ring disposed in a radial space between the outer circumference of the head and the inner surface of the shell, said packing being initially compressed axially between an axially facing outward shoulder on the head and an axially facing inner surface of said retaining member and having a length greater than that of the radial space receiving the same to effect the initial compression of the ring when said retaining member is in position, and said ring normally being of less thickness than said radial space to provide for substantial radial deformation of the ring under axial compressive forces to effect a seal for the closure.

HOWARD A. BUEHNER.